United States Patent [19]

Schmidt et al.

[11] Patent Number: 4,783,588

[45] Date of Patent: Nov. 8, 1988

[54] SYSTEM FOR CHARGING AND/OR DISCHARGING X-RAY FILM SHEETS INTO AND/OR FROM CASSETTE, AND A CASSETTE FOR USE IN THE SYSTEM

[75] Inventors: Manfred Schmidt, Kirchheim; Herbert Gebele, Sauerlach, both of Fed. Rep. of Germany

[73] Assignee: AGFA-Gevaert AG, Leverkusen, Fed. Rep. of Germany

[21] Appl. No.: 906,913

[22] Filed: Sep. 11, 1986

[30] Foreign Application Priority Data

Sep. 24, 1985 [DE] Fed. Rep. of Germany ....... 3533953

[51] Int. Cl.⁴ ............................................. G03B 42/04
[52] U.S. Cl. .................................... 235/467; 235/479; 250/327.2; 414/411
[58] Field of Search ............... 235/467, 462, 475, 479, 235/483, 485, 486; 250/327.2; 414/411; 378/162, 210

[56] References Cited

U.S. PATENT DOCUMENTS

| | | | |
|---|---|---|---|
| 4,097,729 | 6/1978 | Seligman et al. | 235/467 |
| 4,204,639 | 5/1980 | Barber et al. | 235/462 |
| 4,498,005 | 2/1985 | Oono et al. | 250/327.2 |
| 4,553,369 | 11/1985 | Debes et al. | 414/411 X |
| 4,575,703 | 3/1986 | Shishido | 235/479 |

FOREIGN PATENT DOCUMENTS

| | | |
|---|---|---|
| 0079557 | 5/1983 | European Pat. Off. . |
| 3147956 | 1/1984 | Fed. Rep. of Germany . |
| 3232148 | 8/1984 | Fed. Rep. of Germany . |

Primary Examiner—Philip H. Leung
Attorney, Agent, or Firm—Michael J. Striker

[57] ABSTRACT

An apparatus for automatic charging and discharging an X-ray film sheet into a cassette includes a bar code reader having an illumination device and a rotary scanning mirror. The cassette is provided on its top with a bar code label which irrespective of the format of the cassette is always located at a fixed distance from a leading edge and from a lateral guiding edge of the cassette. The cassette is insertable into an intake compartment and only after the cassette reaches an end position in the compartment a limit switch activates the scanning mirror and the illumination device of the reader, thus eliminating reading errors when reading bar codes on cassettes of different formats.

4 Claims, 1 Drawing Sheet

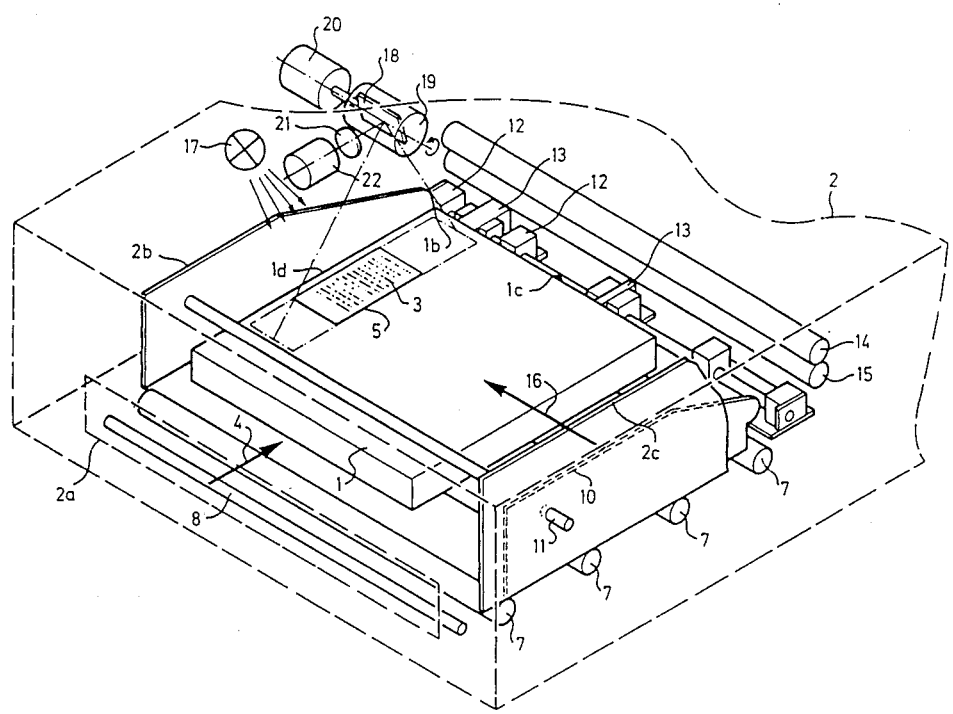

SYSTEM FOR CHARGING AND/OR DISCHARGING X-RAY FILM SHEETS INTO AND/OR FROM CASSETTE, AND A CASSETTE FOR USE IN THE SYSTEM

BACKGROUND OF THE INVENTION

The present invention relates to a system for an automatic charging and/or discharging of X-ray film sheets into and/or from cassettes of different formats; the cassettes are of a flat rectangular configuration and are provided on one of its major walls with a label carrying information in the form of a bar code about the cassette and/or the film sheet contained in the cassette. The system also includes an apparatus for the automatic charging and/or discharging of a film sheet into a cassette, the apparatus including a conventional electrooptical bar code reader.

X-ray film sheet charging and discharging apparatuses of this kind are known for example from the German patent No. 3,232,148. A disadvantage of this prior art apparatus is a relatively complicated determination of the format of a cassette to be inserted and, consequently the selection of a film sheet to be reinserted into the cassette is also relatively complicated.

From the European patent application No. 00 79 557 it is known to provide storing foils or X-ray films with bar codes or magnetic codes located in the range of an openable illumination window of a cassette so as to enable an automatic reading information concerning the storage foil. In addition, from the German Patent No. 3,147,956 it is also known how to apply an erasable bar code or magnetic code or an electrostatic code on the cover of an X-ray cassette in order to check an intended multiple exposure or illumination.

However, if it is desired to employ such prior art bar codes for information about the cassette or film sheet format and to read the information in an automatically operating charging and/or discharging apparatus, a difficulty is encountered when cassettes of completely different formats are to be inserted into the charging and discharging apparatus. Cassettes of large format during the advance into the intake compartment are due to their size guided with sufficient accuracy in the prescribed feeding direction so as to reliably reach their working position in which the automatic bar code reader can read the code without problems. However the smaller is an inserted cassette the more frequently a possibility occurs that during the transport the cassette becomes misaligned relative to the feeding direction and consequently when reaching its end position in which it is realigned there is the probability that in the case of small format cassettes only a part of the bar code passes within the range of the code reader, resulting in incorrect reading of the coded information and a malfunction in the automatic selection of a film to be inserted in the cassette.

SUMMARY OF THE INVENTION

It is, therefore, a general object of this invention to provide an improved cassette charging system of the above described kind in which the arrangement of the bar code and of the bar code reader in the automatic charging and discharging apparatus allows a reliable pickup of the coded information even in small cassettes which are prone to take an oblique position during their feeding in the apparatus.

In keeping with this object and others which will become apparent hereafter, one feature of this invention resides, in a cassette charging and discharging system of the above described kind, in the provision of an automatically operating apparatus for charging and discharging an X-ray film sheet into and/or from a cassette, the apparatus including an intake compartment provided with a guiding wall and with means for stopping a cassette in a fixed working position, an electrooptical bar code reader arranged above the intake compartment and including an illumination device and a rotary scanning mirror, at least one X-ray film cassette of a flat rectangular configuration insertable into said intake compartment and including a top wall having a guiding edge engageable with a guiding wall and a leading edge engageable with stopping means, the top wall carrying a rectangular bar code label arranged at a fixed distance from the guiding and leading edges, and the bar code reader being located at such a position in the apparatus that the illumination device and the scanning mirror illuminates and scans a bar code on the label when a cassette of any format is situated in its working position.

In the preferred embodiment, the scanning mirror has an axis of rotation which extends parallel to the bars of the bar code and the optical axis of the code reader extends at right angles to the bars. The supplying means include a limit switch actuated by the X-ray film cassette when the latter is brought into its working position, the limit switch activating the illumination device and the bar code reader together with a drive for the rotary scanning mirror.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates in a perspective view parts of the system of this invention including an apparatus for the automatic charging and discharging of a film sheet into a cassette and an X-ray film cassette shown in its working position in the intake compartment of the apparatus.

DESCRIPTION OF THE PREFERRED EMBODIMENT

In the FIGURE, reference numeral 1 indicates an X-ray film sheet cassette of a medium size. The cassette is illustrated only schematically and consists of a bottom part and a cover part. Non-illustrated locking means for the cover part are designed such that an apparatus 2 for automatically charging and/or discharging an X-ray film sheet into the cassette, automatically unlocks the cover part when the cassette reaches the illustrated working position. The charging and discharging apparatus 2 is of a conventional kind known from prior art and is capable of processing cassettes of different formats. For example, in a discharging operation, an exposed X-ray film contained in the cassette 1 is removed from the open cassette and according to format data sensed by the apparatus, a new film sheet of the corresponding format is introduced into the cassette 1, the cover part is closed and the cassette is discharged. In order to simplify the determination of the cassette and film format a major flat side of the cassette 1 preferably the top surface 1a of the cover part which upon insertion of the cassette into the apparatus 2 is normally above the bottom part, is provided with a bar code 3 containing the information about the cassette 1, such as data about the size of the cassette or of the film sheet to be charged. For the case that several kinds of film sheets are available for respective cassette formats, for example, film sheets for normal and mammography,the bar code 3 may contain additional information about the kind of the additional film sheet. The bar code 3 on cassettes of any format occupies the same position relative to a corner 1b of the cassette and hence the corresponding corner of the intake compartment of the apparatus 2. In the shown example this reference corner is formed by a guiding edge 1d and by a leading edge 1c of the cassette when viewed in the direction of insertion 4. The bar codes 3 on all cassettes of different formats have the same size and are spaced apart from the edges 1c and 1d about the same fixed distances.

In the shown example the bars of the bar code 3 extend parallel to the leading edge 1c. If a cassette of smaller format is inserted into the intake compartment at an oblique position, whereby upon reaching the end position the reference corner 1b does not coincide with the corresponding corner of the compartment. In this case, the bar code is not completely positioned below the scanning mirror 18 of a bar code reader of the apparatus 2 and consequently the code reader would make an erroneous reading and the apparatus 2 would be incorrectly controlled.

In the shown embodiment of the invention there is provided a rectangular label 5 carrying the bar code 3. The label 5 extends parallel to the guiding edge 1d of the top surface of the cassette whereas the individual bars of the code 3 extend at right angles to the guiding edge and parallel to the leading edge 1c. As mentioned before irrespective of the cassette format the position of the bar code 3 relative to the reference edge 1b is always the same and only the mutual position of the code bars differ according to the assigned cassette. In order to avoid reading errors in the system of this invention the bar code 3 is read only after the cassette 1 has reached its fully aligned working position and reading is not accomplished by a stationary reading apparatus but by means of the rotating scanning mirror. Moreover, upon reaching the correct working or end position the cassette 1 is illuminated from above by an illumination device 17. The illumination device emits light of such a wavelength for which the film material contained in the cassette is insensitive. The rotary scanning mirror 18 scans the label 5 along its longitudinal side. The mirror with advantage is arranged in a cylinder 19 which is rotated by a coaxially supported driving motor 20. The rotating mirror scans one bar after another in the code 3 and reflects the light rays along an optical axis passing through an optical device 21 and an automatic sensor or reader 22. The housing of the apparatus 2 is indicated by dashed lines only and also the remaining parts of the apparatus 2 which are not essential for this invention, are indicated only schematically. Moreover, for the sake of clarity the device for removing a film sheet from the cassette and forwarding the sheet into a developing device, the dispensing storage containers for new X-ray film sheets of different formats and the charging device are not illustrated. The apparatus 2 has an intake compartment into which the cassettes are inserted in feeding direction 4 through opening 2a in the housing. The intake compartment is delimited by lateral guiding walls 2b and 2c. The transport of a cassette 1 in the intake compartment is carried out in conventional manner by transport rollers 7 preceded by a switching roller 8 which upon insertion of a cassette 1 into the opening 2a automatically switches on the drive of the transporter rollers 7. The drive for the transporter rollers 7 or other conventional transport means is switched off after the leading edge 1c of the cassette reaches the illustrated working or end position. The lateral walls 2b and 2c support a guiding rod 11 extending transversely to the feeding direction 4 and supporting a sliding partition 10 adjoining the inner surface of the right hand guiding wall 2c. The rear end of the intake compartment is delimited by devices 12 which serve for stopping the inserted cassette in its working end position. The devices 13 serve for opening the cover of the cassette and withdrawing the X-ray film sheet between the transporting rollers 14, 15. The latter rollers discharge the withdrawn film sheet and charge the cassette with a new one. It is also possible after the cassette has reached the illustrated working position to move stepwise the cassette into consecutive stations where the cassette is opened, the film sheet is withdrawn and a new sheet is charged in. However, since for this invention the illustrated working position in which the bar code 3 is read is of interest, the remaining devices are not described in detail.

When a cassette 1 is advanced in feeding direction 4 into abutment against the stopping devices 12, the sliding partition 10 is automatically driven in the direction indicated by arrow 16 and shifts laterally the cassette against the guiding wall 2b until the left hand leading corner 1b of the cassette and the corresponding leading edge 1c and the guiding edge 1d are in contact with the guiding wall 2b and the stop devices 12 of the intake compartment. As a result, the bar code label 5 of any cassette irrespective of its size is located in a predetermined scanning region (indicated by dash-and-dot lines) of the rotary mirror 18. As described previously, the rotary mirror 18, the optical means 21 and the bar code reader 22 are arranged above the bar code label 5. A light source 17 which is arranged beyond lateral guiding wall 2b emits light to which a film sheet to be exchanged is unsensitive. The emitted light illuminates the bar code 3. After the cassette reaches its fixed end position, a limit switch associated with devices 12 activates a driving motor 20 for the rotary scanning mirror 18 and the latter starts rotating preferably by 360°. In doing so, the consecutive bars of the bar code 3 are reflected along the optical axis of optical means 21 into the reader 22. In this manner, the automatic reading of the code is not accomplished during the feeding movement of the bar code in the direction of arrow 4 but occurs only after the cassette has been brought to a standstill and the rotary scanning mirror 18 has been actuated. Preferably, the drive 20 for the mirror 18 after the completion of a cycle is automatically deenergized and reactivated upon the insertion of a next cassette 1 into the apparatus 2. Upon decoding the read out code the apparatus makes ready a film supply magazine corresponding to the decoded information. The opening, discharge, recharge, closing and the discharge of the cassette 1 from the apparatus 2 are again affected in a conventional manner known from the art.

Known are also automatic charging and discharging apparatuses in which cassettes of different formats are brought into their fixed working position which is not determined by a reference corner 1b of the intake chamber but by a central line in the intake compartment aligned with the feeding direction 4. In this case the bar code label 5 on all cassettes of different formats must be situated at a predetermined distance from this center line. Similarly, the position of the bar code reader must be adjusted with respect to the center line of the intake compartment 2a.

It is also of advantage to provide the bar code reader with a device which in the event when no bar code 3 is detected delivers a warning signal indicating that the cassette 1 was inserted into the opening 2a of the intake compartment with the wrong side up.

While the invention has been illustrated and described as embodied in a specific example of an automatic X-ray film sheet charging and discharging apparatus, it is not limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A system for charging and/or discharging X-ray film sheets into and/or from cassettes of different formats, comprising an automatically operated apparatus for charging and/or discharging an X-ray film sheet into and/or from a cassette, the apparatus including a cassette intake compartment provided with means for advancing the cassette in a feeding direction, a lateral guiding wall, means for stopping the cassette in the feeding direction, and means for shifting the cassette into a fixed end position in engagement with said guiding wall and said stopping means; an electrooptical bar code reader arranged at a fixed location above said intake compartment and including a rotary scanning mirror for reflecting light rays from a predetermined scanning region extending along said guiding wall, and a device for illuminating said scanning region; an X-ray film cassette of a flat rectangular configuration insertable into said intake compartment and including a removable flat top wall having a lateral guiding edge and a leading edge; said top wall being provided with a bar code label containing information about the cassette and film sheet format, said label being fixed at a location which is within the bounds of said scanning region when the cassette is in said fixed end position; and said stopping means including a switch for activating said illumination device and said scanning mirror when the cassette reaches said fixed end position.

2. A system a defined in claim 1, wherein said rotary scanning mirror is a plane mirror rotatable about an axis of rotation directed parallel to bars of said bar code label, and said reader further including optical means having an optical axis directed at right angles to said axis of rotation.

3. A system a defined in claim 1, wherein said apparatus includes control means cooperating with said bar code reader to select in response to a decoded information the cassette and film sheet format and feed a film sheet to be inserted into said cassette.

4. A system a defined in claim 1, wherein said stopping means includes a limit switch turned on by said cassette to activate said illumination device and said scanning mirror; and means for turning off said limit switch when said scanning mirror has completed a scanning cycle.

* * * * *